United States Patent
Endo

(10) Patent No.: US 9,583,275 B2
(45) Date of Patent: Feb. 28, 2017

(54) SOLID ELECTROLYTIC CAPACITOR AND METHOD OF MANUFACTURING THE SAME

(71) Applicant: NIPPON CHEMI-CON CORPORATION, Tokyo (JP)

(72) Inventor: Shunsuke Endo, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 252 days.

(21) Appl. No.: 14/362,123

(22) PCT Filed: Nov. 30, 2012

(86) PCT No.: PCT/JP2012/081058
§ 371 (c)(1),
(2) Date: May 31, 2014

(87) PCT Pub. No.: WO2013/081099
PCT Pub. Date: Jun. 6, 2013

(65) Prior Publication Data
US 2014/0328007 A1   Nov. 6, 2014

(30) Foreign Application Priority Data

Dec. 1, 2011 (JP) ................................ 2011-263340

(51) Int. Cl.
  *H01G 9/02* (2006.01)
  *H01G 9/15* (2006.01)
  *H01G 9/00* (2006.01)
  *H01G 9/028* (2006.01)

(52) U.S. Cl.
  CPC ............ *H01G 9/15* (2013.01); *H01G 9/0032* (2013.01); *H01G 9/0036* (2013.01); *H01G 9/028* (2013.01); *Y10T 29/417* (2015.01)

(58) Field of Classification Search
  USPC ....................................................... 361/525
  See application file for complete search history.

(56) References Cited

U.S. PATENT DOCUMENTS

| 6,239,965 B1 | 5/2001 | Shiraishi et al. |
| 6,989,289 B1 | 1/2006 | Shiraishi et al. |
| 8,339,770 B2 | 12/2012 | Yoshida et al. |
| 8,411,416 B2 | 4/2013 | Kurita et al. |
| 9,023,186 B1* | 5/2015 | Patibandla ............. C25D 5/022 205/124 |
| 2007/0047178 A1 | 3/2007 | Saitou et al. |
| 2010/0103590 A1 | 4/2010 | Saida et al. |
| 2010/0165546 A1* | 7/2010 | Yoshida ............... H01G 9/0036 361/525 |
| 2012/0087062 A1 | 4/2012 | Kurita et al. |

FOREIGN PATENT DOCUMENTS

| CN | 1237773 A | 12/1999 |
| CN | 101203925 A | 6/2008 |
| CN | 101385105 A | 3/2009 |
| CN | 102217016 A | 10/2011 |
| JP | 10-321474 A | 12/1998 |
| JP | 11-121281 A | 4/1999 |
| JP | 2002-313684 A | 10/2002 |
| JP | 2006-294843 A | 10/2006 |
| JP | 2007-096284 A | 4/2007 |
| JP | 2007-110074 A | 4/2007 |
| JP | 2010-116441 A | 5/2010 |

OTHER PUBLICATIONS

Office Action issued May 31, 2016 in Chinese Patent Application No. 2012-80058967.4.
Office Action issued Oct. 4, 2016, in Japanese Patent Application No. 2013-547230.

* cited by examiner

*Primary Examiner* — Eric Thomas
(74) *Attorney, Agent, or Firm* — Shapiro, Gabor and Rosenberger, PLLC

(57) ABSTRACT

There is provided a solid electrolytic capacitor which can increase an electrostatic capacitance and reduce ESR characteristics, and a method of manufacturing the solid electrolytic capacitor. The solid electrolytic capacitor has: a dielectric oxide film formed on a surface of an anode body having fine pores; a cathode body opposing to the anode body; and conductive polymer layers formed inside the fine pores and including amines and water-soluble self-doped conductive polymers having sulfonic acid groups. The self-doped conductive polymers are held in a good state inside fine pores such as etching pits, so that the electrostatic capacitance increases and ESR characteristics are reduced.

10 Claims, No Drawings

SOLID ELECTROLYTIC CAPACITOR AND METHOD OF MANUFACTURING THE SAME

TECHNICAL FIELD

The present invention relates to a solid electrolytic capacitor in which a conductive polymer compound is used as a solid electrolyte, and to a method of manufacturing the solid electrolytic capacitor.

BACKGROUND ART

Conventionally, a solid electrolytic capacitor in which conductive polymers are used as solid electrolytes is known. A solid electrolytic capacitor of this type is generally formed by using as an anode body a porous sintered body obtained by molding and sintering fine particles of a valve action metal such as aluminum and tantalum, forming a dielectric oxide film inside and on outer surfaces of pores of the sintered body by way of electrochemical anodization etc., and interposing a conductive polymer compound layer in close contact with the oxide film to lead out a cathode body which is to be an counter electrode (Patent Document 1). In a solid electrolytic capacitor in which a conductive polymer compound layer is formed in this way, a capacitance appearance rate is improved by forming etching pits on an anode body surface portion with etching processing, and forming the conductive polymers inside the etching pits.

RELATED TECHNICAL DOCUMENTS

Patent Documents

Patent Document 1: JPH 11-121281

Since etching pits formed by etching are generally several hundreds of nano levels, it is difficult to form conductive polymer layers in deep portions of the etching pits. Therefore, before a conductive polymer layer is formed, coating water-soluble self-doped conductive polymers thin on the entire surfaces of etching pits in advance to make up for a decrease in an electrostatic capacitance due to portions in which conductive polymers cannot infiltrate is attempted. After the water-soluble self-doped conductive polymers are formed on the etching pit surfaces, conductive polymers on unnecessary portions are washed and removed by water or an aqueous solvent.

However, in this case, water-soluble conductive polymers dissolve in water and are removed together with unnecessary conductive polymers, therefore which leads to a problem that the electrostatic capacitance decreases and ESR characteristics increase. Furthermore, after forming water-soluble self-doped conductive polymers on etching pit surfaces, a dispersion aqueous solution of conductive polymers is applied and dried to form a conductive polymer layer. In this case, the water-soluble conductive polymers dissolve in this dispersion aqueous solution and are removed, therefore which leads to a problem that the capacitance decreases and ESR characteristics increase.

The present invention has been made to solve the above-described problem, and an object of the present invention is to provide a solid electrolytic capacitor which can increase an electrostatic capacitance and reduce ESR characteristic, and a method of manufacturing the solid electrolytic capacitor.

SUMMARY OF THE INVENTION

As a result of making a devoted study on a solid electrolytic capacitor to solve the above-described problem, the inventors of the present invention found out that, by forming conductive polymer layers including amines and water-soluble self-doped conductive polymers having sulfonic acid groups, the self-doped conductive polymers are held inside fine pores such as etching pits in a good state, and the electrostatic capacitance increases and ESR characteristics are reduced, and finished up the present invention.

That is, a solid electrolytic capacitor according to the present invention has: a dielectric oxide film formed on a surface of an anode body having fine pores; and a conductive polymer layer formed inside the fine pores and includes amines and a water-soluble self-doped conductive polymer having a sulfonic acid group.

Furthermore, a solid electrolytic capacitor according to the present invention has: a dielectric oxide film formed on a surface of an anode body having fine pores; a water-soluble self-doped conductive polymer layer formed inside the fine pores and having a sulfonic acid group; and an amines-containing layer formed on a surface layer of the water-soluble self-doped conductive polymer layer and includes amines.

Still further, a solid electrolytic capacitor according to the present invention has: a dielectric oxide film formed on a surface of an anode body having fine pores; a water-soluble self-doped conductive polymer layer formed inside the fine pores and having a sulfonic acid group; and a coupled layer formed on a surface layer of the water-soluble self-doped conductive polymer layer in which the sulfonic acid group of the water-soluble self-doped conductive polymer is coupled to amines.

A method of manufacturing a solid electrolytic capacitor according to the present invention includes: forming a dielectric oxide film on a surface of an anode body having fine pores; and forming inside the fine pores a conductive polymer layer including amines and a water-soluble self-doped conductive polymer having a sulfonic acid group.

Furthermore, a method of manufacturing a solid electrolytic capacitor according to the present invention includes: forming a dielectric oxide film on a surface of an anode body having fine pores; forming inside the fine pores a water-soluble self-doped conductive polymer layer having a sulfonic acid group; and contacting the water-soluble self-doped conductive polymer layer with a solution including amines.

The present invention can provide a solid electrolytic capacitor which can increase an electrostatic capacitance and reduce ESR characteristics, and a method of manufacturing the solid electrolytic capacitor.

DESCRIPTION OF EMBODIMENTS

Hereinafter, a solid electrolytic capacitor according to the present invention will be described in order according to examples of a method of manufacturing the solid electrolytic capacitor.

(Formation of Anode Body Having Fine Pores)

As an anode body having fine pores, an etching foil obtained by first etching a flat metal foil (e.g. valve action metal foil such as aluminum) and forming a dielectric oxide film on the metal foil by chemical conversion coating can be used. For example, minute fine pores (etching pits) are formed in an aluminum foil of 100 μm by alternate current etching, and then chemical conversion coating is performed in an aqueous solution such as a phosphoric acid. Such an etching foil includes minute fine pores (etching pits) of at least 100 nm or less in deep portions thereof.

Furthermore, fine pores can also be formed by forming a metal particle coating on a metal foil such as aluminum by deposition etc. By using, for example, aluminum whose degree of purity is 99.8% as a deposition source and performing resistance heating deposition in an atmosphere of inert gas and oxygen, an aluminum layer having a thickness of about 20 μm can be formed on the aluminum foil. A metal oxide film layer may be formed in advance on the surface of aluminum which is to be a deposition source. As deposition methods, for example, other deposition methods such as an ion plating method, a sputtering method, an ion beam sputtering method and an ion beam-assisted deposition method can be used in addition to the above-described resistance heating deposition. A stable dielectric oxide film layer may be formed on the obtained deposition foil by performing chemical conversion coating in an aqueous solution such as a phosphoric acid. The aluminum foil formed by means of such a deposition method has minute fine pores of at least 50 nm or less in deep portions thereof.

In view of the above, the fine pores of the anode body preferably have diameters in a range of at least 1 to 100 nm taking into account a case of deposition and a case of etching pits. Meanwhile, this is not to exclude fine pores having diameters exceeding 100 nm, and, as long as fine pores have a range of 1 to 100 nm at a certain portion, fine pores may have diameters exceeding 100 nm at portions other than the certain portion. The diameters of the fine pores can be measured by a mercury intrusion technique.

(Restoration Chemical Conversion)

The above-described aluminum etching foil or aluminum deposition foil is cut to a predetermined size (a size of 10×10 mm, for example) and chemical conversion coating is applied to an anode body surface of this flat aluminum etching foil or aluminum deposition foil at 5 V for about 30 minutes in an ammonium adipic acid aqueous solution, for example, to form an aluminum dielectric oxide film. Next, this anode body is immersed in a predetermined chemical conversion liquid and is applied a voltage to subject to restoration chemical conversion.

As a chemical conversion liquid for restoration chemical conversion, a phosphoric acid chemical conversion liquid such as ammonium dihydrogen phosphate or diammonium hydrogen phosphate, a borate chemical conversion liquid such as ammonium borate, and an adipic acid chemical conversion liquid such as an ammonium adipic acid can be used, and above all, ammonium dihydrogen phosphate is desirably used. Furthermore, a time for which the above aluminum etching foil or the aluminum deposition foil is immersed in a chemical conversion liquid and is applied the voltage to subject to restoration chemical conversion is desirably 5 to 120 minutes.

(Formation of Self-Doped Conductive Polymer)

Next, fine pore portions of an anode body after restoration chemical conversion are coated with or impregnated in water-soluble self-doped conductive polymers having sulfonic acid groups, then after drying it at a room temperature for 10 minutes, it was dried at 130° C. for 10 minutes. Herein, as water-soluble self-doped conductive polymers having sulfonic acid groups, for example, a poly(isothianaphtenediyl-sulfonate) compound can be suitably used. In addition, a polymer skeleton in units of pyrrol ($C_4H_5N$), aniline ($C_6H_5NH_2$), thiophene ($C_4H_4S$) or furan ($C_4H_4O$), or derivatives of these in which sulfonic acid groups are introduced may be used. More specifically, polyaniline-sulfonic acid, polyalkyl-aniline sulfonic acid, and polyalkyl-thiophene sulfonic acid can be suitably used.

Subsequently, the above-described water-soluble self-doped conductive polymer layer is coated with or impregnated in a solvent added with amines, then after leaving it at a room temperature for 10 minutes, it is dried at 130° C. for 10 minutes. In this regard, various amines can be used as amines coupling with sulfonic acid groups, but aromatic amine or alkyl amine is included in particular. These amines are preferably alkyldiamines such as ethylenediamine ($C_2H_8N_2$), butanediamine ($C_4H_{12}N_2$), octanediamine ($C_8H_{20}N_2$), decanediamine ($C_{10}H_{24}N_2$) and phenylenediamine ($C_6H_8N_2$), and decanediamine is the most preferable among them. Furthermore, as a solvent to be added with amines, water, lower alcohols and a mixed solution thereof are used, and as a lower alcohol, methanol, ethanol and propanol are included.

When a poly (isothianaphtenediyl-sulfonate) compound represented by the following chemical formula 1 is used as water-soluble self-doped conductive polymers having sulfonic acid groups and decanediamine represented by the following chemical formula 2 is used as amines, the sulfonic acid group of the poly (isothianaphtenediyl-sulfonate) compound is coupled with decanediamine as represented in the following chemical formula 3. The sulfonic acid group of this self-doped conductive polymers and amines are coupled and formed near the surface layer of the self-doped conductive polymer layer.

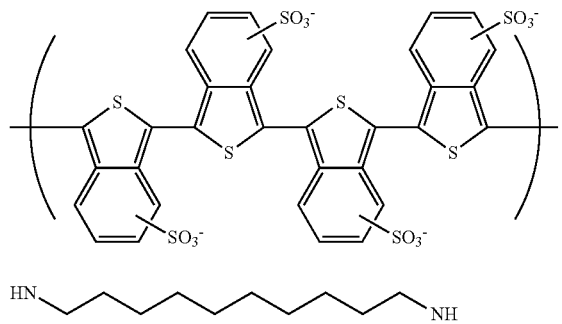

[Chemical Formula 1]

[Chemical Formula 2]

-continued

[Chemical Formula 3]

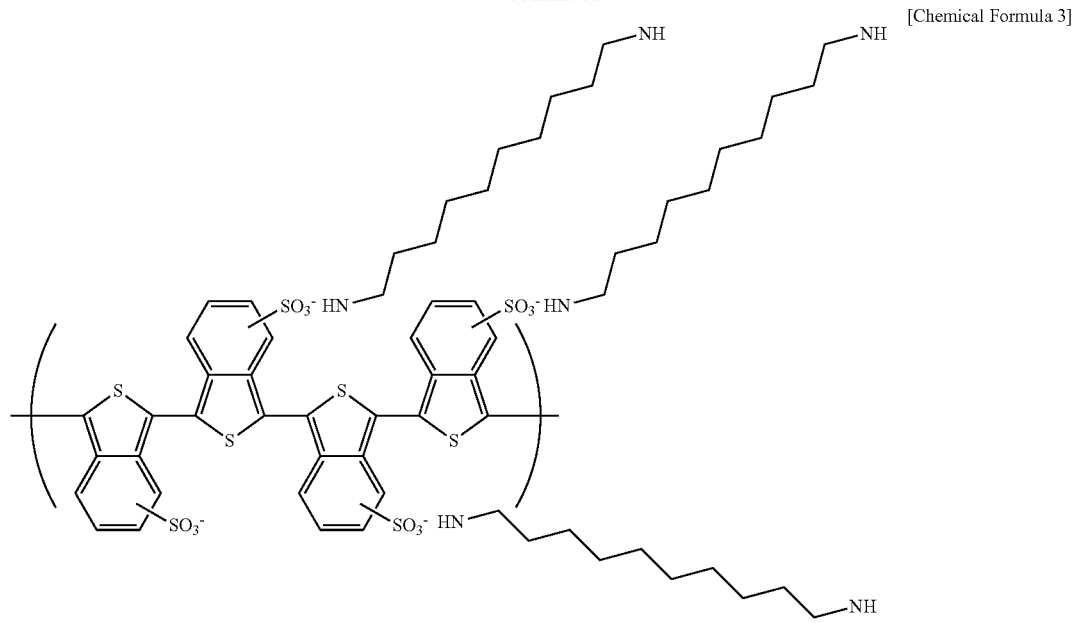

As described above, after the sulfonic acid groups of the water-soluble self-doped conductive polymers are coupled with amines such as decanediamine, it is washed to remove a residual compound such as uncoupled amines and dried at 130° C. for 10 minutes.

(Formation of First Conductive Polymer Layer)

Next, a process where a dielectric oxide film and self-doped conductive polymers are coated with a dispersion aqueous solution in which the conductive polymer compound is dispersed, left at a room temperature for 10 minutes, and then heated at 130 C° for 10 minutes is performed as one cycle, and this cycle is repeated several times to form a first conductive polymer layer.

As a dispersion aqueous solution in which the conductive polymer compound is dispersed, for example, a solution in which powders of a conductive polymer compound consisted of poly-(3,4-ethylenedioxythiophene) (referred to as PEDOT below) are dispersed in water as a solvent can be used. Furthermore, the concentration of the conductive polymer compound can be 0.1 to 4 wt % with respect to the aqueous solution. It should be noted that a solvent of a dispersion solution of a conductive polymer compound may be other than water as long as a conductive polymer compound is dispersed in the solvent.

(Formation of Second Conductive Polymer Layer)

Next, after the first conductive polymer layer is coated, for example, once with a mixed solution consisted of a dispersion solution in which a conductive polymer compound of the same as or different from the above conductive polymer compound is dispersed, and ethylene glycol, it is heated at 130° C. for 10 minutes to form a second conductive polymer layer. Similar to the dispersion solution used to form the first conductive polymer layer, a dispersion solution including a conductive polymer compound consisted of PEDOT whose concentration is 0.1 to 4 wt % with respect to the aqueous solution can be used for a dispersion solution in which a conductive polymer compound is dispersed.

(Formation of Conductive Polymer Layer by Chemical Polymerization or Electrolytic Polymerization)

Instead of the above-described first and second conductive polymer layers, a conductive polymer layer formed by chemical polymerization or a conductive polymer layer formed by electrolytic polymerization may be formed.

In the conductive polymer layer formed by chemical polymerization, a solid electrolytic layer is formed by immersing an aluminum etching foil or an aluminum deposition foil in a mixed solution of polymerizable monomers and an oxidant using 3,4-ethylenedioxythiophene as the polymerizable monomers and an alcohol solution (e.g. ethanol) of ferric p-toluenesulfonic acid as the oxidant, and causing a polymerization reaction of conductive polymers by heating. Furthermore, water washing processing of removing unreacted monomers or extra monomers by water washing may be performed before and after this heating.

By contrast with this, in the conductive polymer layer formed by electrolytic polymerization, a conductive polymer layer is formed on a surface of a self-doped conductive polymer layer by electrolytic polymerization. This self-doped conductive polymer layer is used as an electrode and power is fed from a supply electrode to form a conductive polymer layer. Monomers having conductivity as a result of electrolytic polymerization can be used for this electrolytic polymerization solution. Thiophene monomers or pyrrol monomers are suitable for monomers. When these monomers are used, an aluminum etching foil or an aluminum deposition foil is impregnated in a stainless steel container in an electrolytic polymerization solution containing monomers and 1-sodium naphthalenesulfonate which is a supporting electrolyte, and is applied a predetermined voltage. Consequently, a conductive polymer layer containing water-soluble monomers (e.g. thiophene or pyrrol) can be uniformly formed by electrolytic polymerization.

(Formation of Cathode Conductive Layer)

Furthermore, the second conductive polymer layer or the conductive polymer layer formed by chemical polymerization or electrolytic polymerization is coated with a carbon layer and dried at 160° C. for 30 minutes, then is coated with a silver paste layer and dried at 160° C. for 60 minutes, to from a cathode conductive layer and form a solid electrolytic capacitor.

(Capacitor Element)

The above-described solid electrolytic capacitor manufacturing method is applicable to a capacitor element of a single plate using a flat aluminum etching foil or aluminum deposition foil, a capacitor element of a stack type in which the single plates are stacked, or a capacitor element of a winding type which is wound via a separator comprised of an insulating paper between flat aluminum etching foils or aluminum deposition foils. It should be noted that, in a capacitor element of a winding type, after a wound capacitor element is formed, the above-described self-doped conductive polymers and amines are subsequently formed, and a conductive polymer layer (first and second conductive polymer layers or a conductive polymer layer formed by chemical polymerization or electrolytic polymerization) is further formed, preferably.

(Function and Effect)

After forming water-soluble self-doped conductive polymer layers having sulfonic acid groups in fine pores, if a washing process or a contacting process with an aqueous solvent is included, it is difficult to hold the water-soluble self-doped conductive polymers in fine pores because they dissolve in water. However, by making the water-soluble self-doped conductive polymers having sulfonic acid groups contain amines, it is speculated that the water-soluble conductive polymers become insoluble in water. Consequently, a good state is held inside fine pores even after washing, so that the capacitance appearance rate and the ESR characteristics improve.

Particularly, by coating a water-soluble self-doped conductive polymer layer formed in fine pores with a solution including amines and drying it, the water-soluble self-doped conductive polymers are made in contact with amines to form a conductive polymer layer including amines and the water-soluble self-doped conductive polymers. Consequently, the water-soluble self-doped conductive polymers become insoluble or are hardly peeled off from fine pores when they contact with an aqueous solvent. Particularly, amines are contained near a surface layer of the water-soluble self-doped conductive polymer layer, and sulfonic acid groups of the water-soluble self-doped conductive polymers near this surface layer are coupled with the amines so as to form a thin film whose surface is reformed. This thin film whose surface is reformed has a hydrophilic property, and dissolution of the water-soluble self-doped conductive polymer layer is limited because the aqueous solvent prevents infiltration in the water-soluble self-doped conductive polymer layer. It should be noted that, the first conductive polymer layer is formed on this water-soluble self-doped conductive polymer layer by coating a dispersion aqueous solution in which a conductive polymer compound is dispersed and drying it. However, as this dispersion aqueous solution has high compatibility with respect to a conductive polymer layer including the amines and the water-soluble self-doped conductive polymers having sulfonic acid groups, the amines-containing layer formed near a surface layer of the water-soluble conductive polymers and including the amines, or a coupling layer in which sulfonic acid groups of the water-soluble self-doped conductive polymers formed near this surface layer and amines are coupled, and thus the fine first conductive polymer layer is formed.

Furthermore, among fine pores, etching pits include fine pores of several hundreds of nm levels, and there are fine pores of 100 nm or less in deep portions thereof. Still further, fine pores obtained by a deposition method are much finer, and are several tens of nm levels. Generally, in such case of the fine pores of this level, even when a conductive polymer layer is formed using a dispersion solution of conductive polymers, fine particles of the conductive polymers have a size of several hundreds of nm levels, and therefore the fine particles hardly enter fine pores obtained by the deposition method, and also it is difficult to bring out a capacitance of a solid capacitor. By contrast with this, in case of water-soluble self-doped conductive polymers according to the present invention, even when the self-doped conductive polymers are such minute fine pores, they can be impregnated in fine portions of the fine pores because of their water-solubility, so that it is possible to bring out a capacitance of the solid electrolytic capacitor. Particularly, it is effective for a deposition foil having minute fine pores and formed by the deposition method.

EXAMPLES

Examples of the present invention will be more specifically described, and the effect of the present invention will be demonstrated.

Example 1

Verification of Etching Foil

First, a flat aluminum etching foil having multiple etching pits was chemically converted at 5V for 30 minutes in an ammonium adipic acid (75 g/L) aqueous solution, and an aluminum dielectric oxide film was formed on the surface of the aluminum etching foil. Subsequently, this aluminum etching foil was cut into a flat shape having a size of 10×10 mm, then it was immersed in an ammonium dihydrogen phosphate (0.5 g/L) aqueous solution to subject to restoration chemical conversion at 5 V for 40 minutes. By measuring the distribution of fine pores of this etching foil, it was confirmed that there were fine pores in a range of at least 30 to 100 nm.

Next, 0.5 μL of a poly(isothianaphtenediyl sulfonate) compound was dropped as water-soluble self-doped conductive polymers having sulfonic acid groups on etching pit portions, then after drying it at a room temperature for 10 minutes, it was dried at 130° C. for 10 minutes. Subsequently, a methanol solution whose concentration of amines was 0.5 wt % using decanediamine as amines was prepared, 1.5 μL of the methanol solution was dropped on the water-soluble self-doped conductive polymers having sulfonic acid groups, and then it was left at a room temperature for 10 minutes. Furthermore, it was washed by showering for 1 minute, then washed by water for 10 minutes and finally dried at 130° C. for 10 minutes.

Next, a dispersion solution was made by mixing polyethylenedioxythiophene as conductive polymers in water to have a concentration of 0.4 wt %, and then 1.5 μL of this dispersion solution was dropped on the self-doped conductive polymers and the oxide film, then after leaving it at a room temperature for 10 minutes, it was dried for 10 minutes. These dropping, leaving and drying were included in one cycle, and this cycle was repeated three times to form the first conductive polymer layer. Next, 4 μl, of a mixed solution of ethylene glycol and water, in which polyethylenedioxythiophene was dispersed as conductive polymers, was dropped on the first conductive polymer layer, and then it was heated at 130° C. for 10 minutes to form the second conductive polymer layer. Furthermore, this second conductive polymer layer was coated with a carbon layer and dried at 160° C. for 30 minutes, and then it was coated with a silver paste layer and dried at 160° C. for 60 minutes, to form a cathode conductive layer and make a solid electrolytic capacitor.

Example 2 to Example 5

The solid electrolytic capacitors were made in the same way as in Example 1 except that, as amines, ethylenediamine was used in Example 2, butanediamine was used in Example 3, octanediamine was used in Example 4 and phenylenediamine was used in Example 5.

Comparative Example 1 and Comparative Example 2

In Comparative Example 1, a solid electrolytic capacitor was made in the same way as in Example 1 except that water-soluble self-doped conductive polymers having sulfonic acid groups and amines were not coated to etching pits respectively. In Comparative Example 2, a solid electrolytic capacitor was made in the same ways as in Example 1 except that amines were not coated on self-doped conductive polymers.

With respect to the solid electrolytic capacitors of Example 1 to Example 5 and the solid electrolytic capacitors of Comparative Example 1 and Comparative Example 2 made in this way, electrostatic capacitances (120 Hz) and ESRs (120 Hz and 100 kHz) were measured after heat tests conducted at 170° C. for 22 hours. Measurement results of the electrostatic capacitance (120 Hz) and the ESRs (120 Hz and 100 kHz) are shown in Table 1.

TABLE 1

|  | Aqueous amines (concentration of 0.5 wt) | Cap [µF, 120 Hz] | ESR [120 Hz, Ω] | ESR [100 Hz, Ω] |
| --- | --- | --- | --- | --- |
| Example 1 | Decanediamine | 11.4 | 2.10 | 0.031 |
| Example 2 | Ethylenediamine | 11.5 | 2.40 | 0.074 |
| Example 3 | Butanediamine | 11.7 | 2.90 | 0.031 |
| Example 4 | Octanediamine | 11.0 | 2.80 | 0.050 |
| Example 5 | Phenylenediamine | 11.9 | 2.50 | 0.030 |
| Comparative Example 1 | Without self-doped conductive polymer | 9.4 | 3.27 | 0.102 |
| Comparative Example 2 | Without aquous amines | 10.5 | 4.22 | 0.110 |

In view of a result in Table 1, the solid electrolytic capacitors in Example 1 to Example 5 in which amines were used had good electrostatic capacitance and ESR characteristics values regardless of types of amines. Particularly, in Example 1 where decanediamine was used among the amines, ESR characteristics at 120 Hz and 100 kHz had good values. Particularly, in Comparative Example 2 where the self-doped conductive polymer layer was formed without using the amines, the electrostatic capacitance and the ESR characteristics were low compared to Example 1 to Example 5, and when the first conductive polymer layer was formed, it was confirmed that part of the self-doped conductive polymers were peeled off from insides of the etching pits due to the dispersion solution (aqueous solution) of the first conductive polymer layer.

Example 6 to Example 9

Subsequently, addition amounts of amine solutions were tested. Solid electrolytic capacitors were made in the same way as in Example 1 using decanediamine as amines except that the addition amount of decanediamine in a methanol solution of decanediamine was changed. The solid electrolytic capacitors were made by adjusting concentrations of decanediamine to 0.25 wt % in Example 6, to 1.0 wt % in Example 7, to 2 wt % in Example 8 and to 3 wt % in Example 9.

With respect to the solid electrolytic capacitors of Example 1 and Example 6 to Example 9 made in this way, electrostatic capacitances (120 Hz) were measured after heat tests conducted at 170° C. for 22 hours. A measurement result of the electrostatic capacitance (120 Hz) is shown in Table 2.

TABLE 2

|  | Aqueous amines | Concentration (wt %) | Cap [µF, 120 Hz] |
| --- | --- | --- | --- |
| Example 6 | Decanediamine | 0.25 | 11.9 |
| Example 1 | Decanediamine | 0.5 | 11.4 |
| Example 7 | Decanediamine | 1.0 | 11.2 |
| Example 8 | Decanediamine | 2.0 | 11.1 |
| Example 9 | Decanediamine | 3.0 | 10.6 |

In view of the result in Table 2, the solid electrolytic capacitors in Example 1 and Example 6 to Example 9 whose concentrations of decanediamine in the methanol solutions were changed had good results in the electrostatic capacitance values. Above all, the solid electrolytic capacitors whose concentrations of decanediamine were 2.0 wt % or less in Example 1 and Example 6 to Example 8 had particularly good electrostatic capacitance values.

Example 10

Similar to Example 1, the poly(isothianaphtenediyl sulfonate) compound was formed as water-soluble self-doped conductive polymers having sulfonic acid groups at etching pit portions of the aluminum etching foil, and then it was further subjected to amine processing using decanediamine.

Next, a conductive polymer layer was formed by chemical polymerization as follows. First, as polymerizable monomers, an ethanol solution of 3,4-ethylenedioxythiophene monomers is used, and as an oxidant, an ethanol solution of ferric p-toluenesulfonic acid is used. an aluminum etching foil to which the above processing was applied was immersed in a mixed solution including the oxidant and the polymerizable monomers at molar ratio of 3 to 1, and it was pulled up. After leaving it for a predetermined period of time, extra monomers and unreacted monomers were removed by water washing. Subsequently, it was heated at 150° C. for 1 hour to cause a polymerization reaction of conductive polymers, and form the conductive polymer layer by chemical polymerization.

Furthermore, similar to Example 1, the solid electrolytic capacitor was made by forming the cathode conductive layer on this conductive polymer layer.

Example 11

A solid electrolytic capacitor was made in the same way as in Example 10 except that a conductive polymer layer was formed by electrolytic polymerization instead of a conductive polymer layer formed by chemical polymerization.

The conductive polymer layer was formed by electrolytic polymerization as follows. First, as polymerizable monomers, 3,4-ethylenedioxythiophene monomers is used, and as a supporting electrolyte, 2-sodium naphthalenesulfonate is used. an electrolytic polymerization solution including polymerization monomers and the supporting electrolyte at a molar ration of 1.0:2.5 was prepared. The aluminum etching foil to which the above processing was applied was impregnated in this electrolytic polymerization aqueous solution in a stainless steel container, and then it was subjected to electrolytic polymerization. At that time, wires are made in contact with the self-doped conductive polymer layer to form an anode, and a cathode is additionally installed in the electrolytic polymerization aqueous solution, electrolytic polymerization was subjected for 30 minutes under a condition of 1.0 mA/piece, thereby forming a polyethylenedioxythiophene (PEDOT) layer.

Comparative Example 3

A solid electrolytic capacitor was made in the same way as in Example 10 except that amines were not coated on self-doped conductive polymers.

Comparative Example 4

A solid electrolytic capacitor was made in the same way as in Example 11 except that amines were not coated on self-doped conductive polymers.

With respect to the solid electrolytic capacitors made in Example 10 and Example 11 and the solid electrolytic capacitors made in Comparative Example 3 and Comparative Example 4, electrostatic capacitances (120 Hz) and ESR (120 Hz and 100 kHz) were measured after heat tests conducted at 170° C. for 22 hours. Measurement results of the electrostatic capacitance (120 Hz) and ESRs (120 Hz and 100 kHz) are shown in Table 3.

conductive polymers were peeled off from the insides of the etching pits due to a water-soluble electrolytic polymerization solution similar to Comparative Example 3.

[Test on Deposition Foil]

Example 12

First, aluminum particles is used for a flat aluminum base member, particle diameters of primary particles of the aluminum particles were in a range of 0.005 to 0.1 μm and oxide films were formed on surface of the aluminum particles. Aluminum fine particles were deposited in an atmosphere of inert gas of a pressure of 0.6 Pa and oxygen gas so that the thickness of the deposition layer was 30 μm. Subsequently, the deposition foil was subjected to anodization by application of voltage of 20 V in an ammonium adipic acid aqueous solution. Next, this deposition foil was cut in a flat shape having a size of 10×10 mm, then it was immersed in an aqueous solution of ammonium dihydrogenphosphate (0.5 g/L) to subject to restoration chemical conversion at 5 V for 40 minutes. A distribution of fine pores of this deposition foil was measured and it was confirmed that there were fine pores in a range of at least 1 to 50 nm.

Next, similar to Example 1, 0.5 μL of a poly(isothianaphtenediyl sulfonate) compound was dropped as water-soluble self-doped conductive polymers having sulfonic acid groups on fine pore portions, then after drying it at a room temperature for 10 minutes, it was dried at 130° C. for 10 minutes. Subsequently, as amines, decanediamine was used, and a methanol solution whose concentration of amines was 0.5 wt % was prepared. 1.5 μL of the methanol solution was

TABLE 3

| | Amines | Condition for foming polymer | Cap [μF, 120 Hz] | ESR [Ω, 120 Hz] | ESR [Ω, 100 Hz] |
|---|---|---|---|---|---|
| Example 10 | Decanediamine | Self-doped conductive polymer + amine treatment + PEDOT chemical polymerization | 13.2 | 1.2 | 0.027 |
| Example 11 | Decanediamine | Self-doped conductive polymer + amine treatment + PEDOT electrolytic polymerization | 13.2 | 1.0 | 0.020 |
| Comparative Example 3 | — | Self-doped conductive polymer + PEDOT chemical polymerization | 12.1 | 4.0 | 0.037 |
| Comparative Example 4 | — | Self-doped conductive polymer + PEDOT electrolytic polymerization | 12.2 | 4.1 | 0.072 |

In view of the result in Table 3, the solid electrolytic capacitors in which amines were used in Example 10 and Example 11 had good electrostatic capacitance and ESR characteristics values compared to those of the solid electrolytic capacitors in which amines were not used in Comparative Example 3 and Comparative Example 4. Particularly, in Comparative Example 3 where a self-doped conductive polymer layer was formed without using amines and a conductive polymer layer was formed by chemical polymerization, the electrostatic capacitance and the ESR characteristics were low compared to those in Example 10 and Example 11, and it was confirmed that part of the self-doped conductive polymers were peeled off from the insides of etching pits upon water washing. Furthermore, in Comparative Example 4 where a self-doped conductive polymer layer was formed without using amines and a conductive polymer layer was formed by electrolytic polymerization, the electrostatic capacitance and the ESR characteristics were low compared to those in Example 10 and Example 11, and it was confirmed that part of the self-doped dropped on the water-soluble self-doped conductive polymers having sulfonic acid groups, and then it was dried at a room temperature for 10 minutes. Furthermore, it was washed by showering for 1 minute, then washed by water for 10 minutes and finally dried at 130° C. for 10 minutes.

Next, polyethylenedioxythiophene as conductive polymers was mixed into water at a concentration of 0.4 wt % to prepare a dispersion solution, then 1.5 μL of this dispersion solution was dropped on the self-doped conductive polymers and on the oxide films, then after leaving it at a room temperature for 10 minutes, it was dried at 130° C. for 10 minutes. These dropping, leaving and drying were included in one cycle, and this cycle was repeated three times to form the first conductive polymer layer. Next, this conductive polymer layer was coated with a carbon layer and dried at 160° C. for 30 minutes, and then it was coated with a silver paste layer and dried at 160° C. for 60 minutes to form a cathode conductive layer and make a solid electrolytic capacitor.

Example 13

A solid electrolytic capacitor was made in the same way as in Example 12 except that a conductive polymer layer was formed by chemical polymerization instead of a conductive polymer layer formed by using the dispersion solution of polyethylenedioxythiophene. The solid electrolytic capacitor was formed by chemical polymerization in the same way as in Example 10.

Example 14

A solid electrolytic capacitor was made in the same way as in Example 12 except that a conductive polymer layer was formed by electrolytic polymerization instead of a conductive polymer layer formed by using the dispersion solution of polyethylenedioxythiophene. The solid electrolytic capacitor was formed by electrolytic polymerization in same way as in Example 11.

Comparative Example 5

A solid electrolytic capacitor was made in the same way as in Example 12 except that amines were not coated on self-doped conductive polymers.

Comparative Example 6

A solid electrolytic capacitor was made in the same way as in Example 12 except that water-soluble self-doped conductive polymers having sulfonic acid groups and amines were not coated on fine pores respectively.

Comparative Example 7

A solid electrolytic capacitor was made in the same way as in Example 13 except that amines were not coated on self-doped conductive polymers.

Comparative Example 8

A solid electrolytic capacitor was made in the same way as in Example 14 except that amines were not coated on self-doped conductive polymers.

With respect to the solid electrolytic capacitors made in Example 12 to Example 14 and the solid electrolytic capacitors made in Comparative Example 5 to Comparative Example 8, electrostatic capacitances (120 Hz) and ESRs (120 Hz and 100 kHz) were measured after heat tests conducted at 170° C. for 22 hours. Measurement results of the electrostatic capacitance (120 Hz) and the ESRs (120 Hz and 100 kHz) are shown in Table 4.

TABLE 4

|  | Amines | Condition for foming polymer | Cap [μF, 120 Hz] | ESR [Ω, 120 Hz] | ESR [Ω, 100 Hz] |
| --- | --- | --- | --- | --- | --- |
| Example 12 | Decanediamine | Self-doped conductive polymer + amine treatment + PEDOT dispersion solution | 11.3 | 4.6 | 0.101 |
| Example 13 | Decanediamine | Self-doped conductive polymer + amine treatment + PEDOT chemical polymerization | 13.5 | 0.9 | 0.085 |
| Example 14 | Decanediamine | Self-doped conductive polymer + amine treatment + PEDOT electrolytic | 13.5 | 0.9 | 0.050 |
| Comparative Example 5 | — | Self-doped conductive polymer + PEDOT dispersion solution | 9.0 | 6.3 | 0.200 |
| Comparative Example 6 | — | PEDOT dispersion solution only | 1.2 | 67.6 | 0.133 |
| Comparative Example 7 | — | Self-doped conductive polymer + PEDOT chemical polymerization | 12.1 | 3.0 | 0.100 |
| Comparative Example 8 | — | Self-doped conductive polymer + PEDOT electrolytic | 12.5 | 5.0 | 0.200 |

In view of the result in Table 4, when aluminum deposition foils were used, the solid electrolytic capacitors of Example 12 and Example 14 using amines had good electrostatic capacitance and ESR characteristics values compared to the solid electrolytic capacitors of Comparative Example 5 to Comparative Example 8 without using amines. Particularly, in Comparative Example 5 where a self-doped conductive polymer layer was formed without using amines, the electrostatic capacitance and the ESR characteristics were low compared to Example 12 to Example 14, and, when a conductive polymer layer was formed, and it was confirmed that part of the self-doped conductive polymers were peeled off from the insides of fine pores due to a dispersion solution (aqueous solution) of this conductive polymer layer.

Furthermore, in Comparative Example 7 where a self-doped conductive polymer layer was formed without using amines and a conductive polymer layer was then formed by chemical polymerization, it was confirmed that part of the self-doped conductive polymers were peeled off from the insides of fine pores upon water washing. Furthermore, in Comparative Example 8 where a self-doped conductive polymer layer was formed without using amines and a conductive polymer layer was then formed by electrolytic polymerization, it was confirmed that part of the self-doped conductive polymers were peeled off from the insides of fine pores due to a water-soluble electrolytic solution.

[Test on Other Self-Doped Conductive Polymers]

Example 15

A solid electrolytic capacitor was made in the same way as in Example 1 except that polyaniline-sulfonic acid was used as self-doped conductive polymers.

Comparative Example 9

A solid electrolytic capacitor was made in the same way as in Example 15 except that amines were not coated on self-doped conductive polymers.

Example 16

A solid electrolytic capacitor was made in the same way as in Example 12 except that polyaniline-sulfonic acid was used as self-doped conductive polymers.

Comparative Example 10

A solid electrolytic capacitor was made in the same way as in Example 16 except that amines were not coated on self-doped conductive polymers.

With respect to the solid electrolytic capacitors made in Example 15 and Example 16 and the solid electrolytic capacitors made in Comparative Example 9 and Comparative Example 10, electrostatic capacitances (120 Hz) and ESRs (120 Hz and 100 kHz) were measured after heat tests conducted at 170° C. for 22 hours. Measurement results of the electrostatic capacitance (120 Hz) and the ESRs (120 Hz and 100 kHz) are shown in Table 5.

TABLE 5

| Foil type | | Amines | Condition for foming polymer | Cap [μF, 120 Hz] | ESR [Ω, 120 Hz] | ESR [Ω, 100 Hz] |
|---|---|---|---|---|---|---|
| Etching foil | Example 15 | Decanediamine | Self-doped conductive polymer + amine treatment + PEDOT dispersion solution | 10.3 | 2.5 | 0.049 |
| | Comparative Example | — | Self-doped conductive polymer + PEDOT dispersion solution | 10.1 | 5.0 | 0.080 |
| Deposition foil | Example 16 | Decanediamine | Self-doped conductive polymer + amine treatment + PEDOT dispersion solution | 12.1 | 4.0 | 0.120 |
| | Comparative Example | — | Self-doped conductive polymer + PEDOT dispersion solution | 11.1 | 6.0 | 0.250 |

In view of the result in Table 5, when the aluminum etching foil was used, the solid electrolytic capacitor of Example 15 using amines had good electrostatic capacitance and ESR characteristics values compared to the solid electrolytic capacitor of Comparative Example 9 without using amines. Particularly, in Comparative Example 9 where a self-doped conductive polymer layer was formed without using amines, it was confirmed that when the conductive polymer layer was formed, part of the self-doped conductive polymers were peeled off from insides of etching pits due to a dispersion solution (aqueous solution) of this conductive polymer layer.

Furthermore, in view of the result in Table 5, when the aluminum deposition foil was used, the solid electrolytic capacitor of Example 16 using amines had good electrostatic capacitance and ESR characteristics values compared to the solid electrolytic capacitor of Comparative Example 10 without using amines. Particularly, in Comparative Example 10 where a self-doped conductive polymer layer was formed without using amines, it was confirmed that when the conductive polymer layer was formed, part of the self-doped conductive polymers were peeled off from insides of fine pores due to a dispersion (aqueous solution) of this conductive polymer layer.

The invention claimed is:

1. A solid electrolytic capacitor comprising:
    a dielectric oxide film formed on a surface of an anode body having fine pores;
    a water-soluble self-doped conductive polymer layer formed inside the fine pores and having a sulfonic acid group; and
    an amine-containing layer formed on a surface of the water-soluble self-doped conductive polymer layer.

2. The solid electrolytic capacitor according to claim 1, wherein the fine pores have a diameter of 1 to 100 nm.

3. A solid electrolytic capacitor comprising:
    a dielectric oxide film formed on a surface of an anode body having fine pores;
    a water-soluble self-doped conductive polymer layer formed inside the fine pores and having a sulfonic acid group; and
    a coupled layer formed on a surface of the water-soluble self-doped conductive polymer layer in which the sulfonic acid group of the water-soluble self-doped conductive polymer is coupled to an amine.

4. The solid electrolytic capacitor according to claim 3, wherein the fine pores have a diameter of 1 to 100 nm.

5. A method of manufacturing a solid electrolytic capacitor comprising:
    forming a dielectric oxide film on a surface of an anode body having fine pores;
    forming inside the fine pores a water-soluble self-doped conductive polymer layer having a sulfonic acid group; and
    contacting the water-soluble self-doped conductive polymer layer with a solution including an amine.

6. The method of manufacturing the solid electrolytic capacitor according to claim 5, further comprising:
    washing and removing a residual amine compound after contacting the water-soluble self-doped conductive polymer layer with the solution including the amine.

7. The method of manufacturing the solid electrolytic capacitor according to claim 6, further comprising:
    forming a conductive polymer layer by coating the anode body with a dispersion solution including a conductive polymer compound dispersed in an aqueous solution and drying the anode body.

8. The method of manufacturing the solid electrolytic capacitor according to claim 5, further comprising:
    forming a conductive polymer layer by coating the anode body with a dispersion solution including a conductive polymer compound dispersed in an aqueous solution and drying the anode body.

9. A method of manufacturing a solid electrolytic capacitor comprising:
    forming a dielectric oxide film on a surface of an anode body having fine pores;
    forming inside the fine pores a conductive polymer layer including an amine and a water-soluble self-doped conductive polymer having a sulfonic acid group; and
    washing and removing a residual amine compound after forming the conductive polymer layer.

10. The method of manufacturing the solid electrolytic capacitor according to claim 9, further comprising:

forming a conductive polymer layer by coating the anode body with a dispersion solution including a conductive polymer compound dispersed in an aqueous solution and drying the anode body.

* * * * *